June 24, 1930.    E. GERLACH    1,767,790

PROCESS AND APPARATUS FOR THE PRODUCTION AND REPRODUCTION OF PHONOFILMS

Filed Oct. 3, 1927    4 Sheets-Sheet 1

Inventor:
Erwin GERLACH
by Ericke, Kehlenbeck & Farley
Attorneys.

June 24, 1930.  E. GERLACH  1,767,790
PROCESS AND APPARATUS FOR THE PRODUCTION AND REPRODUCTION OF PHONOFILMS
Filed Oct. 3, 1927  4 Sheets-Sheet 2

Inventor:
Erwin GERLACH
by Lotka, Kehlenbeck & Farley
Attorneys.

June 24, 1930.   E. GERLACH   1,767,790
PROCESS AND APPARATUS FOR THE PRODUCTION AND REPRODUCTION OF PHONOFILMS
Filed Oct. 3, 1927   4 Sheets-Sheet 3

June 24, 1930. E. GERLACH 1,767,790
PROCESS AND APPARATUS FOR THE PRODUCTION AND REPRODUCTION OF PHONOFILMS
Filed Oct. 3, 1927 4 Sheets-Sheet 4

Inventor:
Erwin GERLACH
by Lotka, Kehlenbeck & Farley
Attorneys.

Patented June 24, 1930

1,767,790

UNITED STATES PATENT OFFICE

ERWIN GERLACH, OF BERLIN-SIEMENSSTADT, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

PROCESS AND APPARATUS FOR THE PRODUCTION AND REPRODUCTION OF PHONOFILMS

Application filed October 3, 1927, Serial No. 223,687, and in Germany August 31, 1925.

This invention relates to a process as well as to arrangements or apparatus for the production and reproduction of phonofilm, more particularly of phonofilms with a photographic record and electric recording and reproducing means, where the record has the shape of a curve which preferably constitutes the boundary between an exposed and a nonexposed portion of the film. The object of the invention is to give the record such a shape as to ensure the best possible utilization of the length and width of the phonofilm. As is well known, the recording sound forces, more particularly when they are due to music, have a very wide range of amplitudes. If the photographic record on the phonofilm is recorded in the normal manner without a prearranged reduction in the ratio of the amplitudes of the waves composing the curved line on the record, certain portions of the record on the film would not have sufficient amplitude to reproduce the higher audio frequencies of the sound while other portions would have so great an amplitude that the curved line would extend beyond the edge of the film and not be recorded. It is an object of the present invention to alter the ratio between the amplitudes of the waves recorded on the phonofilm by the light rays with respect to the ratio of amplitudes between the higher and lower audio frequencies of the sound being recorded, whereby the curve representing the sound record will be compressed in the longitudinal direction of the film.

The amplitude of the waves forming the curved line on the film is inversely proportional to the audible frequencies of the sound being recorded, i. e., the higher frequencies have the smaller amplitudes, and vice versa; as is well known, the amplitudes of the lower notes, more particularly of such as are produced by musical instruments such as double bass, kettle drum, etc., are greater to one or more orders of values than the amplitudes of the higher and highest audible frequencies. The only possibility of eliminating these drawbacks in accordance with the well known state of the art, would be considerably to increase the width of the film. This however is most decidedly to be avoided in view of the high cost of the film material.

Moreover, the phonofilm arrangements hitherto known, are badly utilized, more particularly in the longitudinal direction of the film, for the following reasons:—The record in the longitudinal direction of the film (abscissæ direction of the sound picture or image) must be dimensioned, in recording, in such a manner that it cannot become smaller than a certain limit (minimum length per period) beginning at which the record would become indistinct. It is true that a limit of this kind exists also in the reproduction film, but this limit is generally much lower than in the recording, as in the reproduction apparatus there are provided means or devices which reproduce well even relatively narrow sound curves, that is to say sound curves which are close together or compressed in the longitudinal direction of the film. Consequently, in view of the high cost of the film material, it would be uneconomical if the record on the positive, that is to say reproduction, film had the same length as the record on the negative, that is to say recording film.

The present invention eliminates the above mentioned drawbacks of the phonofilms systems described. The means used for the purpose are as follows:—

In order first of all to make possible the recording and the undistorted reproduction of all amplitudes that have to be considered, from the smallest to the greatest, according to the invention electrical or optical means or devices are provided in the recording apparatus which cause the greater amplitudes to be less well transmitted than the smaller ones, so that in that way the whole range of amplitudes is compressed, namely to such an extent that the record just fills the width of the film. In order to avoid in the reproducing loud speaker the disturbing effect of the amplitude distortion thus produced, it is necessary to produce by similar means in the reproducing apparatus a corresponding anti-distortion or correction, that is to say the selection of greater amplitudes in preference to the smaller ones.

The processes of distortion and de-distortion or correction are illustrated in Figures 1–20 of the accompanying drawings, Figs. 15 and 16 are diagrams illustrating certain relations of frequency and amplitude hereinafter referred to.

Figure 1:
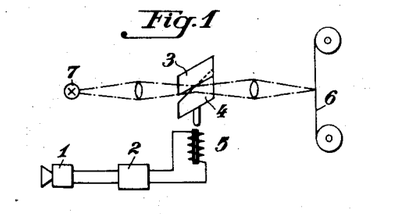
Fig. 1 is a diagram of a recording arrangement embodying my invention.
Figure 2:
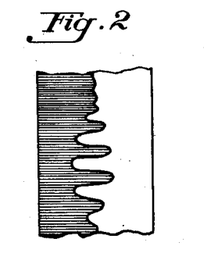
Fig. 2 is a sound record such as may be produced with the arrangement shown in Fig. 1.
Figure 3:
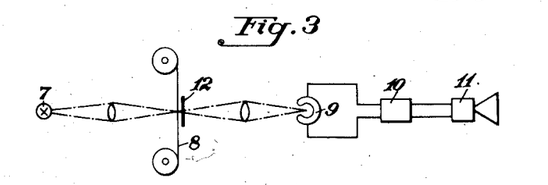
Fig. 3 is a diagram of a reproducing arrangement embodying my invention.

In Fig. 1, 1 is a microphone which is in circuit with an amplifier 2. The amplified speech currents act then on a light controlling device which is constituted for instance by an electro-magnetically operated shutter which controls a ray of light emitted by a source of light 7. The shutter comprises two parts 3 and 4, one of which (or both) is connected to an armature which is moved by the speech currents passing through the coil 5. The effective edges of the shutter parts 3 and 4 form an acute angle with each other; the movement of the movable shutter parts takes place in the direction of length of the film 6. In that way a sound picture is produced such as shown in Figure 2; in the centre of the film is situated the sound curve which is produced by the movement of the point of intersection of the two effective shutter edges; at one side of this curve the film is exposed, at the other non-exposed. Figure 3 shows a reproduction arrangement or apparatus for photofilms; the light from a source of light 7, passing through the positive film 8 and a shutter 12, is modulated as regards its strength, by the record of the film and acts on a photoelectric cell 9 which transforms the light vibrations into vibrations of an electric current. The said electric current passes through an amplifier 10 into the loud speaker 11.

Figure 4:
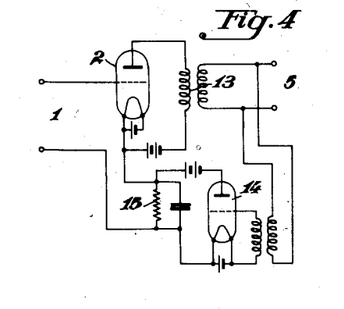
Fig. 4 is a diagram of an arrangement including an amplifier.

The distortion to be produced according to the invention in the recording apparatus, can be obtained either in the electrical part 1, 2, 5 or by the optical system 7, 3, 4, 6, or if desired in the electrical and in the optical part at the same time. By the electrical method, the distortion is produced for instance by building the transmission member 2 so that its capacity of transmission varies automatically in accordance with the amplitude of the current to be transmitted. The variation takes place in the sense that the rate of transmission of the transmission member becomes the smaller, the greater the amplitude of the current to be transmitted (principle of amplitude limitation). Figure 4 shows by way of example such an arrangement, namely for the case in which the transmission member 2 is constituted by an amplifier valve. The currents coming from the microphone 1 pass into the input circuit of the amplifier valve 2. To its output circuit is connected, through a transformer 13, the conductor 5 leading to the light control device. A portion of the currents passing through the said conductor, is however branched off and acts on the input circuit of a three-electrode valve 14 connected as an amplifier. The output circuit of this amplifier valve contains an impedance 15 which is preferably constituted by a resistance with a condenser connected in parallel and which has for its object to smooth out the currents amplified by 14. The impedance 15 is situated at the same time in the input circuit of the amplifier valve 2, and the connection is such that in the case of an increase of the potential fall at 15, which is the greater, the greater the amplitudes to be transmitted, there takes place a shifting of the grid potential of 2 into negative, which reduces the rate of transmission of this valve. In the case of smaller amplitudes, the potential fall at 15 will be correspondingly smaller, the preliminary tension or voltage at the grid circuit 2 will become positive, and the rate of transmission of 2 will be therefore increased.

Figure 5:
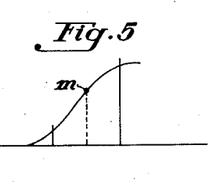
Fig. 5 is a diagram illustrating the character of an electric distortion which I may employ.

An electric distortion of the desired kind can also be obtained by the use of one or more amplifier valves, the characteristic line of which has an upper and a lower kink or bend and is as short as possible in its straight portion. Such a characteristic line is shown in Figure 5.

This line could be obtained, in a manner well known in itself, by a suitable choice of the electrodes. When the working is done then on the indicated centre $m$ between the two bends of the characteristic line, the effective steepness of the characteristic line, that is to say the degree or rate of transmission of the valve, will be comparatively greater for the smaller amplitudes than for the greater ones.

Another method of producing a characteristic line of the kind described consists in arranging two three-electrode valves joined together by capacity-resistance coupling, both valves acting on the lower bend of their characteristic line and having the transmission degree "1". The conversion of phase in this arrangement effects that both half-waves of an alternating current to be transmitted are damped the more the greater they are: the first half-wave by the first valve, the second half-wave by the second valve.

When the amplitude distorting effect of the last and the above described method is too small, both methods can be employed together in the electrical part of the producing arrangement.

This effect could be still further increased in the case of multi-stage amplifiers by a back coupling which is produced for instance by connecting the anode of one valve to the grid of the preceding valve through a condenser. This back coupling will make the described characteristic lines still more pronounced, that is to say the ratio between the steepness of the central portion and that of the outer portions will be still more increased. The condenser must act in such a case in dependence on the frequency, that is to say its capacity must be so great that the impedance will be practically zero even for deep acoustic frequencies. For the purpose of regulating this back coupling, it is preferable, instead of connecting one armature or plate of the condenser direct to the anode of the next valve, to connect it to a suitable point of a resistance inserted between the anode and cathode on earth, and acting as a voltage divider.

These electrical amplitude distortion processes could be used with advantage also in such films in which the sound picture is not in the form of a curve, but in the form of more or less strong "blackenings" of the film, the recording of which takes place in a constant width. For the same applies to the blackenings, as to the sound curve shape; it is very difficult to obtain for the great amplitude ratios of sound vibrations, an equally great range of different degrees of blackening.

Figure 6:
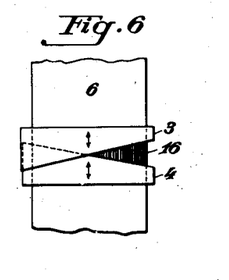
Figs. 6 and 7 are elevations of two forms of shutters I may use.

The limiting of the amplitudes to be recorded could also be done by an optical method, namely by a special construction of the shutter 3, 4 controlling the ray of light. The shutter systems which are mostly employed for phonofilms, have the shape shown in Figure 6, with the effective shutter edges inclined at an acute angle to each other. It will be seen that the efficiency of this shutter will be the greater, the more acute is the angle formed by the two effective edges, for the more acute this angle, the more the point of the exposed triangle 16 will move to and fro in the transverse direction of the film 6, for the same movements of the shutter parts in the direction of the arrow.

Figure 7:
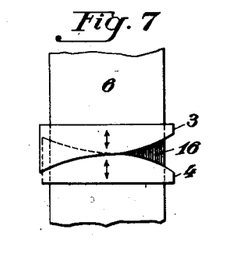

According to the invention, this shutter is constructed for the present purpose of amplitude distortion in such a manner that the effective edges are curved, namely to the shape of an elongated 8, as shown in Figure 7. This figure shows that in the centre of the shutter system, the angle which the two edges make with each other, is very acute, so that the shutter has a relatively great efficiency for the smaller amplitudes. This angle becomes however gradually greater towards the edges of the film.

One of the optical or electrical devices described—if desired both devices could be of course used at the same time—ensures therefore that the ratio of the largest to the smallest amplitudes of the sound waves, which in the action on the microphone amounts for instance to 500:1, is reduced to for instance 100:1, which in the case of recording as a curve, can be conveniently accommodated on a film of a few centimeters' width.

In the reproducing arrangement or apparatus a corresponding de-distortion or correction must be produced, that is to say the capacity of transmission for the greater amplitudes must be increased in the same ratio to that for the smaller amplitudes, to which it was reduced during the recording. This can be again done electrically, for instance by a special construction of a transmission member, for instance of the reproduction amplifier 10 (see Figure 3). This reproduction amplifier is constituted for instance by two valves in push-pull connection. If the "rest" voltages are here selected so that both valves work on the lower bend of their characteristic line, there will be obtained for greater amplitudes a relatively greater increase than for the smaller amplitudes.

Figure 8:
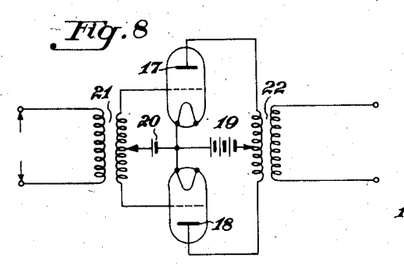
Fig. 8 is a diagram of a form of my invention in which a push-pull amplifier is used.
Figure 9:
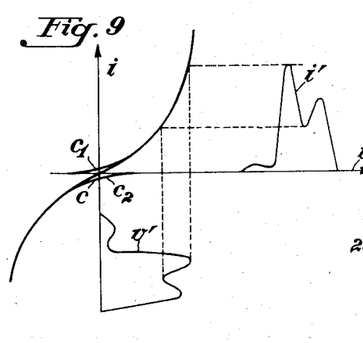
Fig. 9 shows the operating curves of the two amplifier tubes of Fig. 8.

This process is more fully illustrated in Figures 8 and 9. Figure 8 shows by way of example a diagram of connections of such a push-pull amplifier such as is already known for other purposes. The amplifier comprises two valves 17 and 18 with a joint anode battery 19 and a grid battery 20 which are connected each to the centre of a winding of the front transformer 21 and of the rear transformer 22. The working curves $c_1$ and $c_2$ of the two valves are shown in Figure 9. By a voltage $v$ which acts on the primary winding of 21, the grid of one valve is controlled into positive, and that of the other valve into negative. The anode currents of the two valves act in opposite directions on the secondary winding of the rear transformer 22. For that reason, the voltages $v$ and the currents $i$ for the working curve $c_2$ are plotted in the opposite direction to those for $c_1$. The sum of the currents becomes operative in the output winding of the rear transformer. For the push-pull amplifier as a whole there will be obtained the working curve $c$. It is known how, with the assistance of such a working curve, the time curve $i$ of the current can be constructed from the time curve $v'$ of the voltage.

Figure 10:
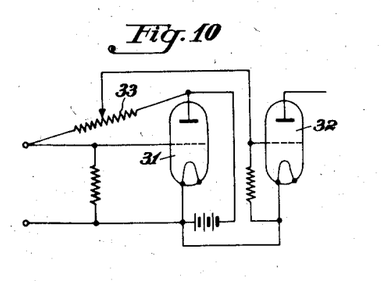
Fig. 10 is a diagram of another form of my invention employing two amplifier tubes or valves.

An amplifier characteristic of the last described kind, that is to say for instance in the form of a tangent curve, can be also be obtained in another way, namely, by a kind of formation of difference between a rectilinear characteristic and a curved one (as shown in Figure 5). This is based on the following idea more fully explained in Figure 10:

Let 32 be an amplifier valve, for instance the initial valve of a cascade amplifier, and 31 an auxiliary valve arranged in front. It is known now that if the grid of 32 were connected to the grid of 31, a transmission would be obtained, in which the auxiliary valve 31 would not exercise any action, more particularly no amplifying action. If however the grid of 32 is connected to the anode of 31, an amplifying action by this valve will be obtained, but at the same time a turning to 180° of the phase of the voltages transmitted. From the latter property it can be concluded that on a resistance arranged between the anode and the grid of 31, there must exist a point, the connection of which to the grid of 32, would render the transmission practically zero, since then any change of voltage from the input terminals would be compensated by an equally great change of voltage, but of opposite phase, from the anode. This compensating action will be perfect only when the variations of the anode current in 31 are proportional to the variations of the input voltage, that is to say as long as one remains on the rectilinear portion of the charactertistic lines of 31. For any amplitudes beyond this rectilinear range, the compensating action will no longer be perfect, that is to say the degree or rate of transmission of the whole arrangement, increases with the increase of the input amplitude. If according to the invention for 31 there is taken a valve with the characteristic line shown in Figure 5, in which the rectilinear portion is as short as possible, the result will be that with the increase of the input amplitude, the compensating action will steadily decrease, and the degree of transmission will continuously increase, so that for the described connection of auxiliary and amplifier valves there will be obtained a characteristic of the form shown in Figure 9 (tangent form). This method can also be employed together with the above described method in case the use of one of these methods is insufficient to effect de-distortion of the amplitude distortion effected by the production arrangement.

Figure 11:
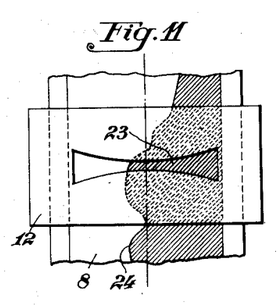
Figs. 11 and 12 are face views of two other forms of shutters.

The correction could also be effected by an optical method, namely by a suitable construction of the shutter 12 of the reproduction apparatus. To that end, instead of providing the slot of the shutter with parallel edges as up to now, it is made wider at its ends than in the middle, as illustrated by way of example in Figure 11. According to Figure 11, the film 8 passes behind the shutter 12. The blackened portion of the film, which is shown cross hatched, is limited by the curve 24. The slot 23 of the shutter is narrower in the middle than at the ends. The result is that during the movement of the curve 24 in the longitudinal direction of the slot, in the event of the curve 24 being situated close to the centre line, less light will be admitted than when it is at the edge of the light strip or band. The production of such a slot, the width of which is in reality very small, can be facilitated by making a model on an enlarged scale and reducing it photographically, in which case either the photographic image itself, or a deposit produced on it galvanically or in some other way, could be utilized as the shutter. The path of rays could also be widened with the help of a cylindrical lens, and a shutter with a greater width of slot used at the widened point.

Figure 12:
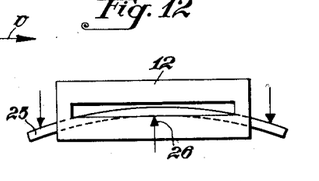
Figure 13:
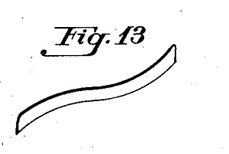
Figs. 13 and 14 illustrate the distorted images of slots that may be obtained with such shutters.
Figure 14:
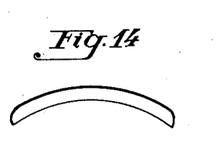

Curves such as are required for the two shutters, can be further obtained in a simple manner by using lenses. When a slot with rectilinear boundaries is reproduced by means of an optical system and placed into the path of rays of a cylindrical lens in such a manner that the surface of the lens is at right angles to the direction of rays and its axis oblique to the direction of the slot, a distorted image of the slot say of the shape shown in Figure 13, will be obtained, as is well known. This shape is very suitable for a recording light indicator, for it has at the point slight steepness, and at both sides, great steepness. On the other hand, by using the edge rays of a spherical lens, the image of a rectilinear slot can be distorted in the manner shown in Figure 14. This shape can be used for the reproduction slot, similarly to that shown in Figures 11 and 12.

Instead of giving the slot a variable width, an absorption body could be inserted into the path of the rays, for instance a "wedge of light", which owing to its shape or to its different blackening, shuts off more light in the centre than at the edges. In that way, the greater amplitudes will be more strongly transmitted than the smaller ones. Both means could also be used at the same time, and if desired the means of electric correction could further be used, so that it becomes possible completely to eliminate again the greatest distortion of amplitude.

If desired the optical methods for eliminating the amplitude distortions can be employed at the same time with the above described electrical methods.

Figure 15:
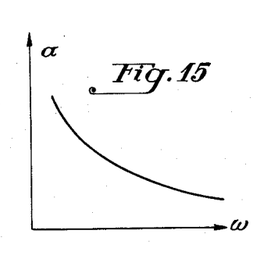
Figure 16:
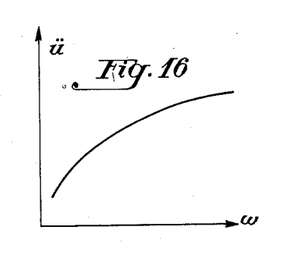
Figure 17:
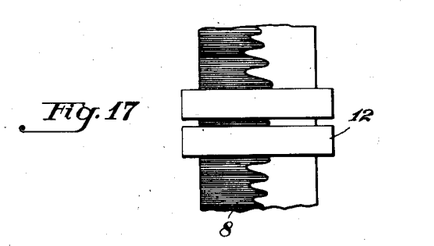
Fig. 17 is a view similar to Fig. 11, but illustrating a different form of shutter.

The great amplitude ratios between the currents of different frequencies, already mentioned in the beginning, can be reduced according to the invention during the recording by devices dependent on frequency and well known in themselves. For instance, in the electric part of the recording apparatus could be arranged trap circuits which strongly damp the lower frequencies, but select the higher ones. If for instance the natural sound of an orchestra has the frequency dependence shown in Figure 15 (W=frequency, a=amplitude) at which the low frequencies have a much greater amplitude than the high ones, it is advisable to provide in the recording apparatus devices which have the frequency dependence shown in Figure 16, that is to say select the high frequencies and suppress the low ones. To that end electrical means are chiefly used, for instance trap circuits with the frequency dependence shown in Figure 16, which preferably are switched in the direction of transmission in front of the amplifiers situated in the path of transmission, in order to prevent these amplifiers from being overloaded by the great amplitudes of the low frequencies.

Another electric means for the selection of higher frequencies in preference to the low ones, consists in the use of back coupling condensers in the multi-valve amplifiers. The latter are constructed in such a manner that the anodes of one or more valves are connected to the grids of one or more preceding valves through small condensers which are so dimensioned that owing to the back coupling they produce an amplified transmission only for the higher frequencies.

The selection of the high frequency can however be effected also already in the microphone, namely by choosing a diaphragm the natural vibration of which is such that it selects the higher frequencies in preference to the lower ones. If desired the described optical means can also be employed at the same time with the above described electrical means.

The correction in the reproduction apparatus takes place in a similar manner. For that purpose selective devices (filters) could be again used. They are preferably inserted only towards the end of the electric path into the reproduction apparatus, in order to avoid overloading of the amplifier valves by the great amplitudes of the low frequencies. The means for correction could also be arranged at the end of the electric path, for instance the natural vibration frequency of the loud speaker could be arranged so that it will select the low frequencies and suppress the high ones.

The last named frequency dependent correction devices are preferably dimensioned in such a manner that, in addition to the frequency dependence intentionally produced in the reproduction apparatus, they cancel at the same time the other undesired frequency dependence phenomena such as are produced for instance by repeaters or the like.

A third method of obtaining the best possible utilization of the width and length of the film, which can be employed with the other two methods, consists according to the invention, in altering the scale of the sound image when copying or printing the film (if desired also during the reproduction) by a lens or mirror arrangement, namely in such a manner that the sound picture or image is altered in the longitudinal direction of the film (abscissæ direction of the record) to a different degree from that in which it is altered in the transverse direction of the film (ordinate). As already stated, for instance on the reproduction (positive) film, the sound picture can be compressed in the abscissæ direction relatively to the negative film, that is to say reduced in scale, whilst such a scale reduction in the ordinate direction would not be as a rule advisable, as otherwise for instance the photoelectric cell could not be sufficiently controlled. On the other hand, in certain cases, according to the nature of the recording or of the reproducing apparatus, it may be necessary, during the printing or during the reproduction, to increase the sound picture in the abscissæ direction or to leave the abscissæ scale unmodified, and to increase or reduce the ordinate scale.

The invention provides further a process which makes it possible to project film phonograms, in copying or in reproducing, in two co-ordinate scales of different sizes. This is done by using a lens system comprising two cylindrical lenses, the axes of which form an angle with each other and the focal distances of which are normally different from each other.

By suitably choosing the position of the two cylindrical lenses and their focal distances, as well as the angle which their axes form with each other, it is possible to obtain any desired rectangular or oblique scale transmission, in which the changes in the two co-ordinate directions are on a different scale. The focal distances of the two lenses need not in every case be different from each other; for instance, in the case in which the magnifying in one co-ordinate direction is as great as the reduction in the other co-ordinate direction, there could also be used two lenses of the same focal distance, one of which is situated close to the record, and the other close to the image.

Figure 18:
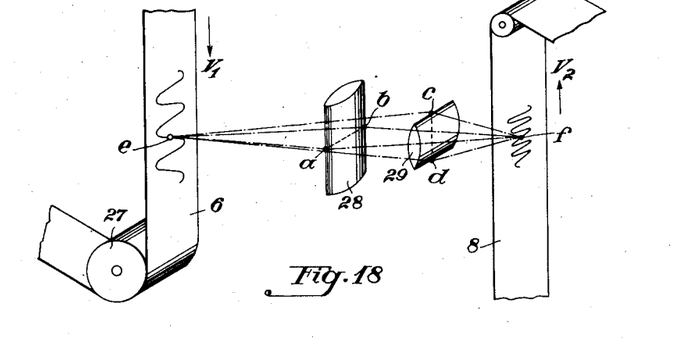
Fig. 18 illustrates an arrangement for obtaining a distorted sound picture.

This arrangement is illustrated by way of example in Figure 18. It shows the printing of a film, the sound picture of the positive film being compressed, whilst the scale remains unchanged in the transverse direction. The negative film 6 travels with the speed $v_1$ over a roller 27. It is to be copied or printed on a film strip 8 which travels with the speed $v_2$. In order to reduce the phonogram length on the positive film without changing the width of the sound curve, the two cylindrical lenses 28 and 29 are placed in the path of rays. The lens 28 arranged in the centre between the two films, the axis of which is parallel to the longitudinal direction of the films, reproduces in the plane $a, b, e, f$ the transverse dimension in the ratio of $1:1$. The cylinder lens 29, the axis of which is parallel to the transverse direction of the films, reduces on the contrary the longitudinal dimensions in the plane $c, d, e, f$. The points of the film 6 constantly come into the light field and are reproduced on the film 8. In order that this reproduction or image should be stationary relatively to the film 8 during the process of printing, the speeds $v_1, v_2$ of the films must be calculated so that they are in the ratio of the optical magnification or reduction taking place in the longitudinal direction of the film.

Figure 18 shows only the parts required for the understanding of the arrangement. The optical arrangement could also be supplemented if desired by spherical lenses which in certain cases could be ground in one piece with the cylindrical lenses.

In the reproduction of a film, the sound image of which must be altered in scale in the longitudinal direction, care must be taken to see that this change of abscissæ does not result in a general increase or lowering of the frequency range reproduced. It is therefore necessary, that the speed of the positive film during the reproduction should be in the same ratio to the speed of the recording film as the abscissæ scales of their two sound pictures to each other.

Figure 19:
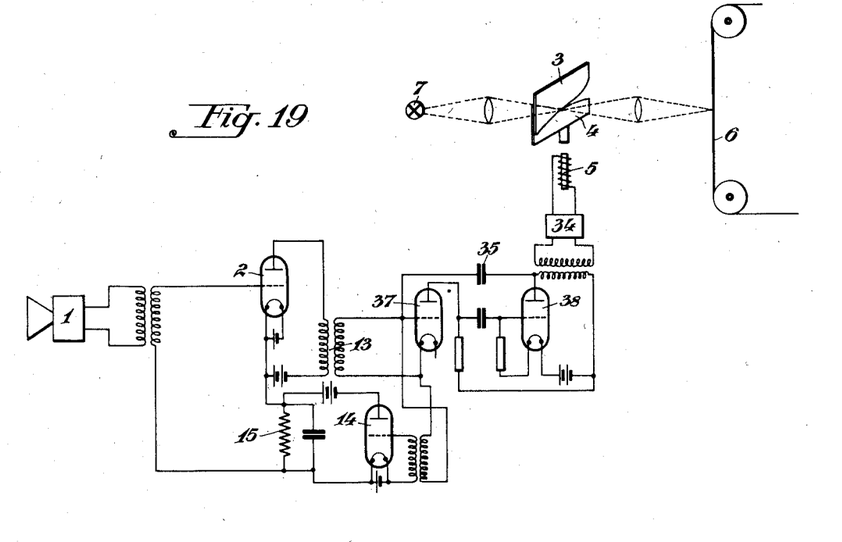
Fig. 19 illustrates a recording device, and Fig. 20 a reproducing device operating in conjunction with such recording device.

Fig. 19 shows the entire recording and reproduction device. To the microphone there is connected an amplifier 2 in which part of the output voltage reacts through a rectifier 14 and an impedance 15 on the grid circuit, so that the grid bias is the more negative the greater the amplitudes to be transmitted are (see Fig. 4). The effect of the amplitude limitation is still further increased by the subsequent valves 37 and 38, which arranged in a resistance-capacity circuit, each have the transmission efficiency "1" and operate on a point of their characteristic which permits the first valve to damp one of the half waves and the second valve to damp the other half wave of the currents to be transmitted with increasing amplitude in consequence of the phase reversal. A reaction condenser 35 independent of frequency is provided to increase this effect. In the recording circuit there is further inserted a filter 34 which preferably cuts out the lower frequencies. The currents finally set in motion a shutter driven electromagnetically, and consisting substantially of electromagnets 5 and the two shutter portions 3, 4, whose edges limiting the light ray are curved so that the smaller amplitudes are preferably recorded, as compared with the greater ones. The recording light source is represented by 7 and the recording film by 6.

Figure 20:
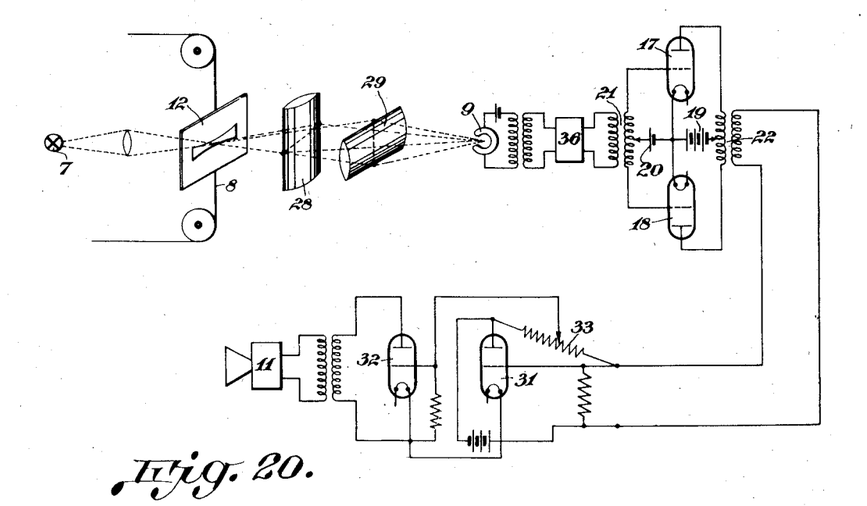

In the reproduction device 7 is a light source, 8 the reproduction (positive) film. As is shown by Fig. 20 the reproduction shutter 12 is narrower in the middle than at the edges, to the effect that, in order to achieve the re-equalization of amplitudes, the greater amplitudes are preferred as compared with the smaller ones. The light cone then passes through a cylindrical pair of lenses 28, 29 which projects the sound picture in the photo electric cell 9 on an increased scale, whereby the scale variation on increasing should be achieved in both co-ordinate directions of the sound picture in a different measure. From the photoelectric cell the currents flow through a filter 36 into a push-pull amplifier 21, 17, 18, 19 whose amplifying characteristic is such that the greater amplitudes are preferred as compared with the smaller ones (see Fig. 8). A further ampliture equalization is achieved by the next amplifier valve 32 connected in series with an auxiliary valve 31 which acts in much the same way, as is shown by Fig. 10. 11 is a loudspeaker or the like, which reproduces the sounds impressed on the microphone without any amplitude or frequency distortion.

What I claim as my invention and desire to secure by Letters Patent is:—

1. Apparatus for the production of phonofilms, comprising in combination an electrical transmission member, means for automatically regulating the degree of rate of transmission in accordance with the amplitude of the currents to be transmitted, in such manner that the great amplitudes of said currents are transmitted with a smaller degree of transmission than the small amplitudes, and a shutter controlling the ray of light, the edges of which are at an acute angle to each other and the movable part of which moves in the longitudinal direction of the film, said edges having the shape of an elongated S, so that the angle of intersection of the two edges is sharper for small amplitudes than for greater amplitudes.

2. In an apparatus for the production of phonofilms, electric means for originating the waves, and means for recording the waves consisting of means for directing a ray of light on the film and a shutter controlled by the waves controlling the ray of light, said shutter consisting of two relatively movable parts having their effective edges in the form of an elongated S.

3. In a device for producing varying amplitude photographic sound films, a source of waves, and means for recording the variations in amplitude of said waves, said means including a source of light and a pair of shutters which are adjustable towards each other in accordance with the variations in amplitude of said waves, the effective edges of said shutters being curvilinear, whereby the said record is distorted.

4. In a device for producing varying amplitude photographic sound films, a source of waves, and means for recording the variations in amplitude of said waves, said means including a source of light and a pair of shutters which are adjustable towards each other in accordance with the variations in amplitude of said waves, the effective edges of said shutters having each the form of an elongated S.

5. In a system for reproducing distorted photographic sound films from a single record, a vacuum tube amplifier which transmits the greater amplitudes in a greater degree than the smaller ones in accordance with a non-linear characteristic.

6. In a system for reproducing distorted photographic sound films, an amplifier whose characteristic curvature is adapted to emphasize the larger amplitudes comprising a tube, a secondary tube in the circuit in advance of said first tube, a resistance between the grid and the anode of the secondary tube, a contact on said resistance, a connection from said contact to the grid of said first tube, said contact being so located that the transmission degree of the secondary tube on account of the impressed voltage becomes small on account of the anode tension which has an opposing phase.

7. In a system for reproducing distorted photographic sound films, an amplifier whose characteristic curvature is adapted to emphasize the larger amplitudes comprising a tube, a secondary tube in the circuit in advance of said first tube, the characteristic of said secondary tube having upper and lower sharp bends and a short straight central portion, a resistance between the grid and the anode of the secondary tube, a contact on said resistance, a connection from said contact to the grid of said first tube, said contact being so located that the transmission degree of the secondary tube on account of the impressed voltage becomes small on account of the anode tension which has an opposing phase.

8. In a device for reproducing distorted photographic sound films, an optical device including means for distorting the larger amplitudes to a relatively greater extent than the smaller amplitudes, said means having a non-linear characteristic.

9. In a device for reproducing distorted photographic sound films, a shutter having an aperture therein, said aperture increasing in width from the center towards the ends.

10. In a device for reproducing distorted photographic sound films, a shutter having an aperture therein, said aperture increasing in width from the center towards the ends, at least one edge of said aperture being curved.

11. The method of producing phonofilms which consists in electrically transmitting the band of audio-frequency currents representing the sound vibrations to be reproduced, amplifying said band in such manner that the higher amplitudes are decreased in amplitude to a relatively greater extent than the lower amplitudes, controlling the movements of a shutter in response to the amplitude variations of the modified currents, said shutter providing a variable slot through which light is transmitted to the phonofilm, and imparting such a characteristic to said slot that the amount of light transmitted therethrough varies non-linearly with respect to the amplitude variations of said modified currents.

12. The method of producing phonofilms which consists in distorting the amplitude of the higher amplitudes of a transmitted band of audio-frequency currents representing sound vibrations to a relatively greater extent than the lower amplitudes, projecting a beam of light upon a portion of said phonofilm through the opening in a movable shutter having curved edges adjacent said opening, and controlling the movements of said shutter in response to the amplitude variations of the distorted currents.

13. The method of producing a phonofilm for sound recording which consists in converting sound vibrations into a band of audio-frequency electrical oscillations, electrically transmitting said band so as to distort the amplitude of the higher amplitudes to a relatively greater extent than the lower amplitudes, translating all amplitudes in said band into corresponding variations in the amount of light used in recording the said sound vibrations, and mechanically increasing the amplitude of the variations responsive to the distortions in amplitude when translating said band.

14. In the process of reproducing distorted photographic sound films, the step of passing currents through a push-pull amplifier and using the curved portion of the characteristic of the amplifier to distort the larger amplitudes to a relatively greater extent than the smaller amplitudes.

15. Apparatus for producing phonofilms comprising means for transmitting electrically the band of audio-frequency currents representing the sound vibrations to be reproduced, means for amplifying said band in such manner that the higher amplitudes are distorted to a greater extent than the lower amplitudes, means for controlling the movement of a shutter in response to the amplitude variations of said modified amplitudes, said shutter providing a variable opening through which light is transmitted to the phonofilm, and whose characteristic is such that the amount of light transmitted to the phonofilm varies non-linearly with respect to the movement of the shutter which is responsive to the said variations.

16. An apparatus for producing phonofilms comprising amplifying means adapted to distort the higher amplitudes to a greater extent than the lower amplitudes of a transmitted band of audio-frequency currents representing sound vibrations, a movable shutter having curved edges adjacent an adjustable opening, means for projecting a beam of light through said opening upon the phonofilm, means for controlling the movements of said shutter in response to the distorted amplitude variations in the said currents, the edges of said shutter being so curved as to cause an increase in the distorting effect of said currents when translated into light variations.

17. System for producing and reproducing varying amplitude photographic sound films, comprising a source of waves, and means for recording the variations in amplitude of said waves, said means including a source of light and a pair of shutters which are adjustable towards each other in accordance with the variations in amplitude of said waves, the effective edges of said shutters being curvilinear for forming a record, and reproducing means comprising a transmission member which transmits the greater amplitudes in a relatively greater degree than the smaller ones in accordance with the time value of the amplitudes.

18. System for producing and reproducing varying amplitude photographic sound films, comprising a source of waves, and means for recording the variations in amplitude of said waves, said means including a source of light and a pair of shutters which are adjustable towards each other in accordance with the variations in amplitude of said waves, the effective edges of said shutters being curvilinear for forming a record, and reproducing means comprising a push-pull amplifier whose characteristic curvature is adapted to emphasize the larger amplitudes and a cascade amplifier in circuit after said push-pull amplifier comprising a tube, a secondary tube in the circuit in advance of said first tube, a resistance between the grid and the anode of secondary tube, a contact on said resistance, a connection from said contact to the grid of said first tube, said contact being so located that the transmission degree of the secondary tube on account of the impressed voltage becomes small on account of the anode tension which has an opposing phase.

19. A system for the production and reproduction of phonofilms, means for producing the phonofilm including electrical means for distorting the amplitude of higher amplitudes to a relatively greater extent than the lower amplitudes of a transmitted band of audio-frequency currents representing sound vibrations, mechanical means for translating the amplitude variations into light variations to be recorded on the phonofilm in such manner as to further increase the relative distortion of the higher amplitudes recorded, and means for reproducing the sound vibrations from said phonofilm including electrical means for converting the light variations from the phonofilm into a band of audio-frequency currents, electrical means for distorting in the opposite sense the amplitude of the higher amplitudes relative to the lower amplitudes, mechanical means for translating the current variations into sound vibrations, and means cooperating with said converting means whereby the ratio of the amplitudes of the higher amplitudes and lower amplitudes is further distorted.

20. A system for the production and reproduction of phonofilms, comprising means for producing a film including a source of waves, amplifying means for distorting the higher amplitudes to a relatively greater extent than the lower amplitudes, a source of light, a pair of shutters controlled by the distorted waves, said shutters being adapted to intercept light from said source and having curvilinear edges so as to further distort the higher amplitudes to a relatively greater extent than the lower amplitudes, and means for reproducing the distorted film including means for projecting light through said film, a shutter between said light and said film having an aperture therein, said aperture increasing in width from the center to the ends so as to distort the higher amplitudes to a relatively greater extent than the lower amplitudes in an opposite sense, means for converting the light variations into electrical waves, amplifying means for further distorting the higher amplitudes to a relatively greater extent than the lower amplitudes, and means for converting the distorted waves into sound waves.

21. In an apparatus for the production of phonofilms, an apparatus for producing electrical oscillations, an amplifier for amplifying said oscillations, a rectifier connected to the output circuit of said amplifier, an impedance in the output circuit of said rectifier, said impedance being placed in the grid circuit of said amplifier, and a single recording device in the output circuit of the amplifier which modifies the oscillations in such a way that the larger amplitudes are recorded on a relatively smaller scale than the small amplitudes.

In testimony whereof I affix my signature.
ERWIN GERLACH.